Patented Oct. 26, 1943

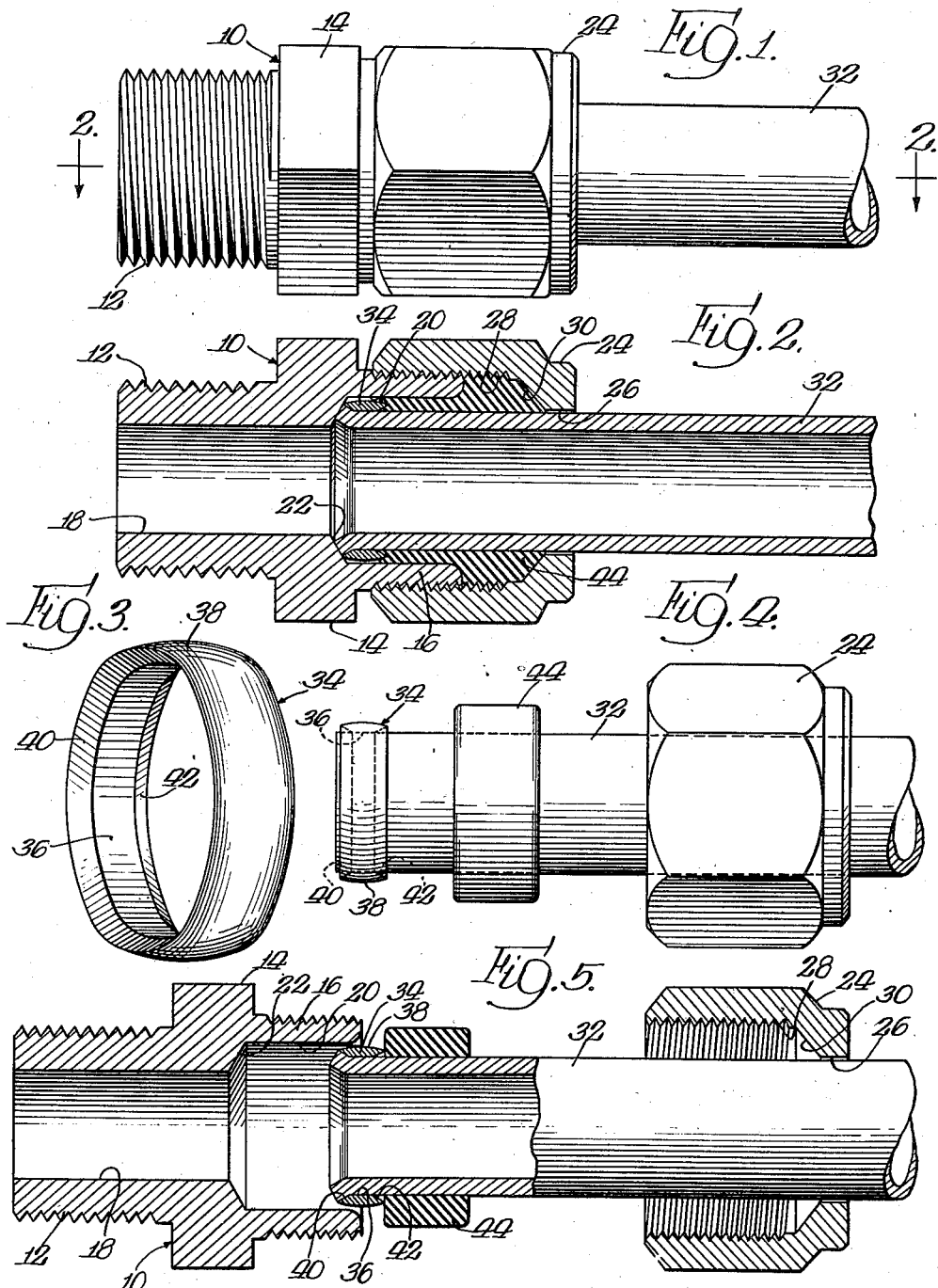

2,332,682

UNITED STATES PATENT OFFICE 2,332,682

ANCHORED FLEXIBLE COUPLING

Gustav Henry Yelinek, La Porte, Ind., assignor, by mesne assignments, to The Imperial Brass Manufacturing Company, Chicago, Ill., a corporation of Illinois Application November 26, 1941, Serial No. 420,488

4 Claims. (Cl. 285—86)

My invention relates to couplings and particularly a coupling for thin-walled tubing having some flexibility at the point where the tube is held in the coupling.

Among the objects of my invention is to provide a new and improved flexible coupling which utilizes a flexible material of the nature of rubber to hold the thin-walled tube in the coupling and which is additionally provided with a novel anchoring means in order to positively insure that the tube cannot be withdrawn endwise out of the coupling once it has been made up.

Another object of my invention is to provide a new and improved flexible coupling which is easy to install and which has an anchoring device adapted to be secured to the end of the thin-walled tubing to be coupled, which can be securely attached without the use of special tools.

With these and other objects in view, my invention consists in the construction, arrangement and combination of the various parts of my anchored flexible coupling, whereby the objects contemplated are attained, as hereinafter more fully set forth, pointed out in my claims and illustrated in the accompanying drawing, in which:

Figure 1 is a side elevation of the assembled coupling,

Figure 2 is a longitudinal sectional view of the coupling in assembled position, Figure 3 is a perspective view of a sleeve used as an anchoring device in the coupling, drawn to a larger scale, Figure 4 is an elevational view of a portion of the coupling showing the several parts in position on the tube prior to insertion into the body, and Figure 5 is a longitudinal sectional view showing all parts of the coupling separated one from another preparatory to assembly.

A variety of flexible couplings have been provided in the past in order to make a joint for thin-walled tubing which has a degree of flexibility in order to prevent fracture of the tubing at the joint and which have been intended to supply sufficient coupling force in order to prevent the tube from being pulled out of the coupling. Some of these old devices have used a flare on the tube itself, which has been brought into contact with a correspondingly flared portion of the coupling joint and there held in contact with the joint by means of some flexible resilient material packed between parts of the coupling. Other types of couplings have relied upon ridges formed on the outside of the tubing or, in some instances, depressions in the outside wall of the tubing which have been filled with some compressible or compactible resilient material. These couplings have been found deficient when the thin-walled tubing itself is worked excessively, such for example, as in making couplings using the larger sizes of tube. The working of the metal of the tube due to vibration has a tendency to crystallize it so that unless the coupling is flexible, its purpose is, in a measure, defeated and early breakage of the tubing results.

In the embodiment chosen to illustrate my invention, there is provided a fitting portion or body 10, having pipe threads 12 at one end, a hexagonal portion 14 to provide a wrench hold and a straight threaded portion 16 at the other end. A passage 18 extends through the fitting and at the end opposite the portion 16 is enlarged to form a recess 20 here shown cylindrical in form. At the bottom of the recess where it joins the passage 18, there is a shoulder 22 which may slope away from the recess toward the point where it joins the passage.

Cooperable with the fitting portion is a nut 24 which has a passage 26 extending through it of a size suited to encircle a tube. The passage has an enlargement 28 at one side which is threaded so as to threadably engage the portion 16 of the fitting portion. Between the enlargement 28 and its passage 26, there is a sloping shelf 30 which slopes toward the passage and away from the enlargement 28.

The fitting portion and nut are designed to be connected to a tube 32 of the customary thin-walled type, such as, copper, aluminum and some types of thin-walled steel tubing.

There is also provided a sleeve 34 which has a substantially cylindrical inside circumference 36 and an outside circumference 38 which may be rounded in a lateral direction, that is, from one side to the other of the sleeve. The rounded shape can best be seen in cross section in Figures 2 and 5. In addition, the sleeve has similar cutback ends 40 and 42 on opposite sides. The ends slope inwardly from the outer circumference so that they approach each other at the point of junction with the inner circumference.

A ring 44 of resilient material is provided, which may initially have any optional cross sectional shape although in Figure 5 it is shown to be rectangular. The resilient ring has an inner circumference of such size as will provide a snug fit around the outer circumference of the tube 32 and has a cross sectional area such as will be comfortably confined within the coupling when it is completely assembled.

When the coupling is assembled, the nut 24 is first slipped over the end of the tubing 32 and then the ring 44 applied, as shown in Figure 4. The sleeve 34 is then slipped over the end. Next, the sleeve is slid toward the end so that the edge of the sleeve is approximately opposite the end of the tubing and it should be noted that the sleeve can be held in proper position by sliding the ring 44 up against it. With the sleeve held in place manually or with the assistance of the flexible ring 44, the end of the tube 32 is belled outwardly by some suitable means. A large nail or almost any smooth surfaced object can be used to bell the tubing outwardly at the end since only a relatively small projection need be made in order to spread the end sufficiently to engage the cut-back end 40 inside the sleeve. It is, of course, advisable to spread the tubing outwardly far enough so that it more or less coincides with the sloping surface of the cut-back end.

Next, the end of the tube with the accompanying sleeve is inserted into the fitting portion or body within the recess 20, until the end of the tube loosely abuts the shoulder 22. While the tube is thus held in place, the nut 24 is drawn up, engaged with the threaded portion of the end 16 of the fitting and the nut drawn tightly into place. As the nut is drawn up, the resilient ring originally having a rectangular cross section is distorted into a shape something like that shown in Figure 2. While it is being distorted, it changes shape and a portion is forced into the outside end of the recess 20 until it may contact the sleeve adjacent the cut-back end 42. The remaining portion of the sleeve is distorted into a pocket-like space formed between the body and the nut when they are threadably engaged.

Once the coupling has been assembled, the end provided with the sleeve 38 will be held snugly in place permitting only a negligible amount of endwise movement. When endwise pull on the tube becomes excessive, the tube is held in place by pressure of a portion of the resilient ring 44 against the sleeve 38. Due to loose contact of the end of the tube with the shoulder 22 and the resilient character of the packing ring 44, some flexing movement of the tube is permitted at the joint without the walls of the tube bending where the clamping effect is tightest. Vibrations set up in either the tube or the coupling, though often of great frequency, are seldom of such amplitude as will bend a tube at the point where it is coupled due to the resilient character of the packing ring. The construction furthermore is a safe one where rigid requirements are paramount in that no amount of pull endwise can separate the tubing from the joint. This is due largely to the fact that the resilient material of the ring 44 when once compacted in the pocket is resistant to compression exerted by pulling the sleeve endwise in a direction outwardly from the joint.

There has thus been provided a flexible coupling having an anchoring device incorporated into it so that in addition to providing a vibration-proof joint, it also provides a safe joint which cannot be pulled apart under extreme conditions.

Some changes may be made in the arrangement and construction of the various parts of my anchored flexible coupling without departing from the real spirit and purpose of my invention, and it is my intention to cover by my claims any modified forms of structure or use of mechanical equivalents, which may be reasonably included within their scope.

I claim as my invention:

1. A flexible tube coupling for thin-walled tubing comprising a fitting portion having a passage therethrough and an enlarged recess at one end of the passage adapted to receive the tube, a nut having a passage therethrough for the tubing and an enlarged portion of said passage at one side, said nut and said fitting portion having a threaded engagement and adapted to be drawn together forming a pocket therebetween, an annular sleeve of non-compressible material having an inside circumference fitting loosely around the tube and in assembled position spaced inwardly from the wall of said enlarged recess, said tube in assembled position having an integral portion of the end thereof spread outwardly against said sleeve to hold the sleeve on the tube and having both sides of the outwardly spread portion spaced a substantial distance from the surrounding portions of the fitting to permit lateral movement thereof, and an annular ring of resilient material initially of optional cross sectional shape engaging the tube at a location inwardly from the sleeve, said coupling in assembled position having the sleeve and accompanying flared end of tubing positioned in face to face contact within the recess partly filling the bottom thereof and said ring being pressed out of its initial shape partly into a position within the outside end of said recess and filling the space between the tubing and the surrounding recess wall and the pocket between the fitting portion and the nut.

2. A flexible tube coupling for thin-walled tubing comprising a fitting portion having a passage therethrough, an enlarged recess at one end of the passage adapted to receive the tube and an abutment sloping toward the central axis forming a bottom for the recess to permit unrestricted lateral movement of the tubing end, a nut having a passage therethrough for the tubing and an enlarged portion of said passage at one side forming an annular shelf, said nut and said fitting portion having a threaded engagement and adapted to be drawn together forming a pocket therebetween, an annular sleeve having an inside circumference fitting loosely around the tube, an outside circumference spaced from the surrounding wall of the recess and a cut-back end extending toward the inside circumference, said tube in assembled position having the end thereof spread outwardly into the form of a fillet positioned against said cut-back end to hold the sleeve on the tube and spaced laterally from the wall of the recess, and an annular ring of resilient material initially of optional cross sectional shape larger in diameter than the diameter of the recess engaging the tube at a location inwardly from the sleeve, said coupling in assembled position having the sleeve and accompanying flared end of tubing positioned face to face within the recess partly filling the bottom thereof and said ring being pressed within the outside end of said recess and filling the pocket between the fitting portion and the nut.

3. A flexible tube coupling for thin-walled tubing comprising a fitting portion having a passage therethrough, an enlarged recess at one end of the passage substantially larger in diameter than the outside diameter of the tube, said recess having an annular bottom sloping toward the central axis forming an abutment over which the tube end may freely shift in a lateral direction, a nut having a passage therethrough for the tubing and an enlarged portion of said passage at one side forming an annular shelf, said nut and said fitting portion having a threaded engagement and adapted to be drawn together forming a pocket therebetween, an annular sleeve having an inside circumference fitting loosely around the tube, an outside circumference substantially smaller in diameter than the diameter of the recess and similar cut-back ends extending inwardly toward each other at the inside circumference, said tube in assembled position having the end thereof spread outwardly into the form of a fillet complementary to said cut-back end and positioned against one of said cut-back ends to hold the sleeve on the tube, and an annular ring of resilient material initially of optional cross sectional shape larger in diameter than the diameter of the recess engaging the tube at a location inwardly from the sleeve, said coupling in assembled position having the sleeve and accompanying flared end of tubing positioned at the bottom of the recess partly filling the adjacent space, said ring being pressed within the outside end of said recess and filling the pocket between the fitting portion and the nut and in contact with opposite sides of the other cut back end of the ring remote from the fillet.

4. A flexible tube coupling for thin-walled tubing comprising a fitting portion having a passage therethrough, an enlarged substantially cylindrical recess at one end of the passage adapted to receive the tube and an abutment at the bottom sloping away from said recess for the end of the tubing, a nut having a passage therethrough for the tubing and an enlarged portion of said passage at one side forming an annular shelf sloping away from the enlargement, said nut and said fitting portion having a threaded engagement and adapted to be drawn together forming a pocket therebetween, an annular sleeve having a cylindrical inside circumference fitting loosely around the tube, a laterally rounded outside circumference adapted to provide a loose fit within said recess and similar cut-back ends extending inwardly toward each other at the inside circumference at an acute angle relative to the axis of the tube, said tube in assembled position having the end thereof spread outwardly in the form of a fillet and positioned face to face with one of said cut-back ends to hold the sleeve in place on the tube, and an annular ring of resilient material initially of optional cross sectional shape engaging the tube at a location inwardly from the sleeve, said coupling in assembled position having the sleeve and accompanying flared end of tubing positioned against the shoulder partly filling the bottom of the recess and said ring being compressed within the top of said recess around both sides of the cut-back end of the ring remote from the fillet and being under lateral pressure adjacent the annular shelf in said nut, said resilient material thereby filling the pocket between the fitting portion and the nut.

GUSTAV HENRY YELINEK.